(No Model.)
A. WATSON.
COMBINED CREAM FREEZER AND REFRIGERATOR.
No. 297,887. Patented Apr. 29, 1884.
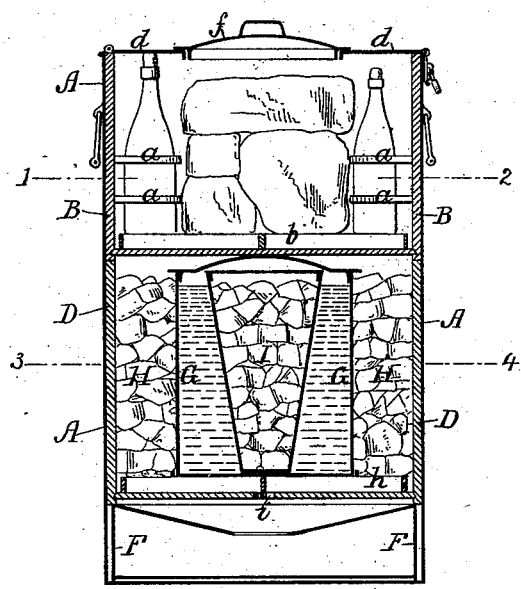
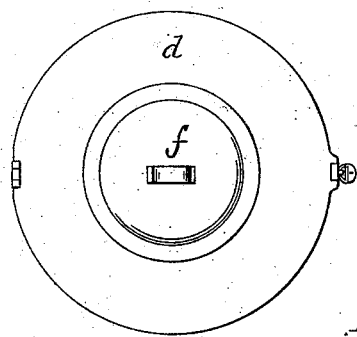
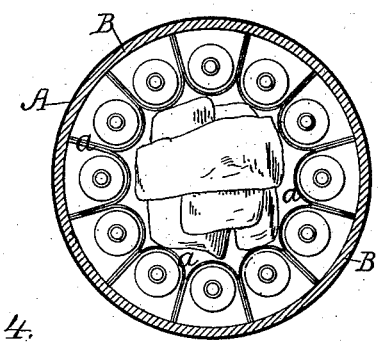
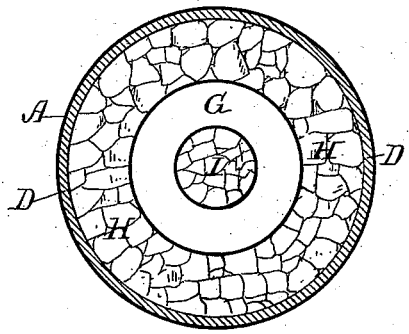
WITNESSES:
John C. Parker
Harry L. Ashenfelter
INVENTOR:
Abraham Watson
by his Attorneys
Howson & Sons

UNITED STATES PATENT OFFICE.

ABRAHAM WATSON, OF GEORGETOWN, DEMERARA, BRITISH GUIANA.

COMBINED CREAM-FREEZER AND REFRIGERATOR.

SPECIFICATION forming part of Letters Patent No. 297,887, dated April 29, 1884.

Application filed August 13, 1883. (No model.)

*To all whom it may concern:*

Be it known that I, ABRAHAM WATSON, a subject of the Queen of Great Britain and Ireland, and a resident of Georgetown, Demerara, British Guiana, have invented a Combined Ice-Cream Freezer and Refrigerator, of which the following is a specification.

The object of my invention is to construct, mainly for household use, a compact and effective device for the making of ice-cream, and for the refrigeration of drinks; and this object I attain in the manner hereinafter set forth, reference being had to the accompanying drawings, in which—

Figure 1 is a vertical section of my improved ice-cream freezer and refrigerator; Fig. 2, a plan view of the same; Fig. 3, a sectional plan on the line 1 2, and Fig. 4 a sectional plan on the line 3 4.

A is an outer casing, which may be of either sheet metal or wood, and which contains in the present instance three vessels, B, D, and F, arranged one above another.

The top vessel, B, has around the outer edge looped wires $a$, forming a rack for the reception of bottles, the central space being filled with ice, which, as well as the bottles, is supported upon an elevated plate or grating, $b$, so that the ice will not rest in the water, and hence will not be melted with undue rapidity. The vessel B has a cover consisting of an outer annular portion, $d$, and central lid, $f$. The annular portion of the cover has at one edge a hinge, and at the other edge a hasp adapted to be secured by a staple and lock, so that the bottles cannot be tampered with and their removal cannot be effected by any one not provided with the proper key. Access to the ice-chamber, however, can readily be had upon removing the lid $f$.

The vessel D is the ice-cream freezer, and contains a vessel, G, of sheet metal, provided with a suitable lid, this vessel G being of such diameter that an ice-chamber, H, is formed around the same, and within the said vessel G is an ice-receptacle, I, also of sheet metal, so that the cream is subjected to freezing influences not only on the outside, but also in the center, the rapid freezing of the cream being thus effected without the necessity of any mechanical agitation of the same or of the vessel containing it. The receptacle I is detachable from the vessel G, so that it will not interfere with the ready removal of the frozen cream from the latter. The vessel G and the ice surrounding the same rest upon a raised plate or grating, $h$, the object of which is to elevate the vessel G above the bottom of the vessel D, so that the water may escape through an opening, $i$, in the bottom of the latter into the drip-pan F below.

The casing A may, if desired, rest on the drip-pan F and drain into the same through a suitable opening; or, by increasing the height of the grating $h$, the vessel F may be dispensed with, and when the outer casing or tub, A, is of wood, the use of a separate vessel D is not absolutely necessary, the outer ice-chamber, H, being formed directly between the vessel G and casing A.

I claim as my invention—

1. The combination of the outer casing, A, with the cream-vessel G, having a central ice-receptacle, I, and the refrigerating-vessel B, comprising a central ice-chamber and surrounding bottle-racks, and located above the vessel G, as set forth.

2. The combination of the vessel B, having a bottle-rack, $a$, and central ice-chamber, with the cover comprising the outer locked rim, $d$, and central detachable lid, $f$, as set forth.

In testimony whereof I have signed my name to this specification in the presence of two subscribing witnesses.

ABRAHAM WATSON.

Witnesses:
HARRY L. ASHENFELTER,
HARRY SMITH.